United States Patent [19]

De Luca et al.

[11] Patent Number: 4,649,456

[45] Date of Patent: Mar. 10, 1987

[54] THREE ELEMENT GAS TUBE PROTECTOR MODULE

[75] Inventors: Paul V. De Luca, Plandome Manor, N.Y.; Paul Shaskan, Stamford, Conn.; Michael Belle-Oudry, Centereach, N.Y.

[73] Assignee: Porta Systems Corp., Syosset, N.Y.

[21] Appl. No.: 883,517

[22] Filed: Jun. 30, 1986

[51] Int. Cl.[4] .................. H02H 3/20

[52] U.S. Cl. .................. 361/119; 361/120; 361/129; 361/130; 337/29; 337/32

[58] Field of Search .................. 361/117-120, 361/124, 130, 129; 337/28, 29, 32-34; 179/91 R, 98

[56] References Cited

U.S. PATENT DOCUMENTS

| | | | |
|---|---|---|---|
| 4,159,500 | 6/1979 | Baumbach et al. | 361/124 X |
| 4,305,109 | 12/1981 | Schilling et al. | 361/130 X |

*Primary Examiner*—A. D. Pellinen
*Assistant Examiner*—Todd E. DeBoer
*Attorney, Agent, or Firm*—Charles E. Temko

[57] ABSTRACT

A three element gas tube type subscriber pair protector module in which the gas tube serves as both a momentary surge protector and a heat responsive means directly operable upon a pair of fusable elements. The number of component parts has been minimized, permitting low manufacturing cost and simplified assembly.

3 Claims, 4 Drawing Figures

THREE ELEMENT GAS TUBE PROTECTOR MODULE

BACKGROUND OF THE INVENTION

This invention relates generally to the field of telephony, and more particularly to an improved protector module for use in conjunction with an individual subscriber pair at its appearance on a protector block located at a telephone company office. Devices of this type are well known in the art, and are manufactured in extremely large quantities, both for use in origina installations and as replacements.

While most original installations over the years have incorporated carbon arc protector inserts, this type of protector has fallen into disfavor in recent years, as a result of observed disintegration of the carbon elements at the operative surfaces thereof causing an improper condition on one or both sides of the line as a result of improper gap spacing.

A more recent development is the gas filled tube which ionizes at predetermined voltage levels to conduct surging currents to ground potential. These tubes are normally employed in conjunction with heat sensitive elements which become operative on the occurrence of sustained excess current loads, as distinguished from momentary current surges. The cost of manufacture of the gas tubes has been reduced as a result of the economies of scale to the point where relatively few carbon type devices are now installed.

In order to further promote use of the gas tube type module, it is necessary to simplify the remaining components thereof so that the total cost of manufacture is directly comparable with that of a carbon arc type module. It is a principal object of the present invention to accomplish this end.

SUMMARY OF THE INVENTION

Briefly stated, the invention contemplates the provision of an improved individual subscriber module employing a known three element gas tube which remains stationary during operation of the heat sensitive components of the device. In place of the conventional wire-wound heat coil which is supported upon a bobbin and an accompanying coil spring actuator to effect a grounding action, there are provided pairs of long contacts, portions of which are supported in partially overlapped relation with respect to a generally U-shaped ground clip carried by the ground pin assembly. The overlapped parts are normally held separated by a pair of solder pellets which melt or fuse within a prescribed time period above a predetermined voltage. The pellets are carried by the long contacts and rest upon insulated strips carried by the arms of the ground clip. The insulative strip has through openings therein which provide secondary air gap means.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
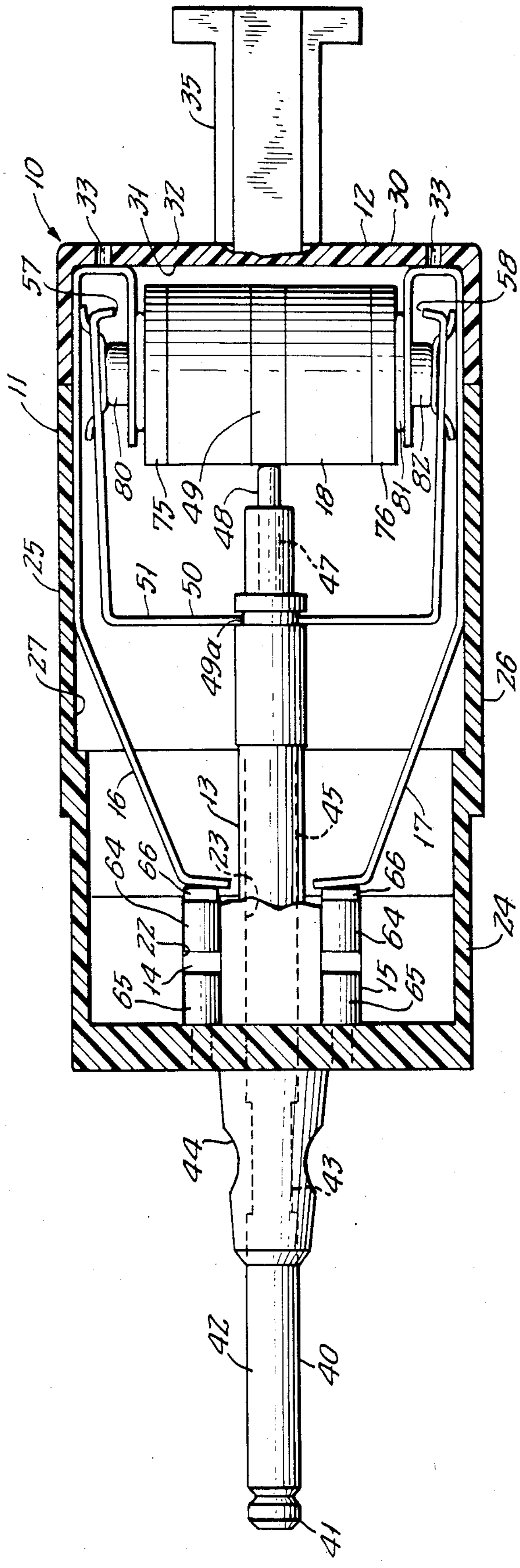
FIG. 1 is a side elevational view, partly broken away to show detail of an embodiment of the invention.
Figure 4:
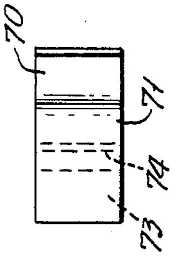
FIG. 4 is an end elevational view as seen from the lower lefthand portion of FIG. 3.
Figure 3:
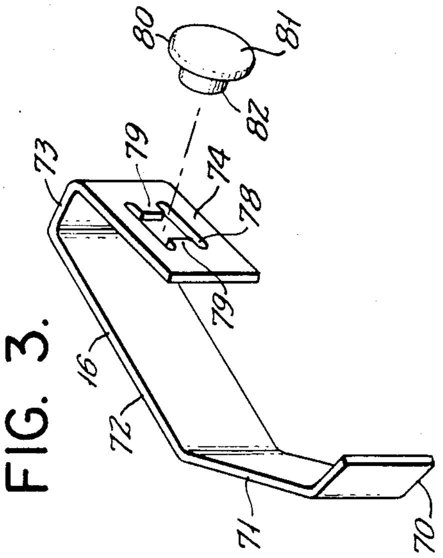
FIG. 3 is an exploded view in perspective of an individual test point contact forming another part of the disclosed embodiment.
Figure 2:
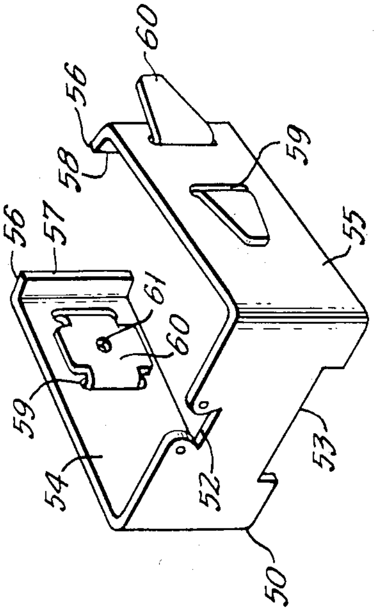
FIG. 2 is a view in perspective of a metallic ground element forming a part of the embodiment.

In accordance with the invention, the device, generally indicated by reference character 10, comprises broadly:

a housing element 11, a cap element 12, a ground pin assembly 13, combination short and long contacts 14 and 15, test point contacts 16 and 17 and a three element gas tube 18.

The housing element 11 is of generally conventional moulded construction, including a base portion supporting the contacts 14 and 15 in corresponding bores 22 and a bore 23 accommodating the ground pin assembly 13. Extending from the base portion are a pair of side walls, one of which is indicated by reference character 24, and a pair of end walls 25 and 26 defining a rectangular cavity 27 which is closed by the cap element 12.

The cap element 12 is also of conventional construction including a transverse wall 30 bordered by inner and outer surfaces 31 and 32 through which openings 33 extend to provide access to test points in known manner. A manually engageable handle 35 permits ready engagement and disengagement of the device 10 with a protector block (not shown).

The ground pin assembly 13 includes the usual elongated ground pin 40 having an outer tip 41, a shaft portion 42, a portion of reduced diameter 43 which accommodates a swaged synthetic resinous extension 44 on the housing element 11. A second shaft portion 45 terminates at an inner tip 46 having a slot 47 supporting a conductor 48 which resiliently contacts a center electrode 49 of the gas tube 18.

Positioned in an annular slot **49*a* is a ground clip 50 in the form of a U-shaped metallic stamping. The clip 50 includes a base wall 51 having a recess 52 engaging the slot 49*a*, and an oppositely disposed slot 53 for positioning the ground clip with respect to the housing element. Extending from the base wall 51 are first and second longitudinally extending walls 54 and 55 which terminate in inwardly extending flanges 56 having edge surfaces 57 and 58 forming the electrical contacts. The walls 54 and 55 are provided with spaced parallel slots 59 which engage and support strips of fiberous insulation 60, the strips having centrally disposed through openings 61** which provide secondary air gap means, as will more fully appear hereinafter.

The contacts 14 and 15 are of U-shaped configuration and are known in the art. Each includes a relatively short contact 64, a relatively long contact 65 and a connecting portion 66 interconnecting therebetween.

The test point contacts 16 and 17 are similar and symmetrically positioned, each including a first end 70, an angularly disposed portion 71, a longitudinally extending portion 72, a transversely extending portion 73 and a second end contact portion 74 which contacts and electrically communicates with the conductive end elements 75 and 76 of the tube 18. The contact portions 74 are provided with elongated cutout portions 78 forming retaining flanges 79 for supporting button-shaped solder pellet 80 having a flattened portion 81 and a shank portion 82.

Operation of the device 10 will be apparent from a consideration of FIG. 1. Upon the occurrence of a momentary excess voltage surge, the gas tube will ionize, and establish conduction of the surge through the center element 14 to the ground pin assembly 13. Upon the occurrence of a continued excess current surge, the tube will likewise ionize, and generate within a predetermined period of time sufficient heat to melt the solder pellets 80, therebypermitting the resiliently biased walls 54 and 55 of the ground clip 50 to move toward each other until the edge surfaces 57 and 58 contact the outer surfaces of the second end terminal portions 74, whereby the excess current will travel the entire length of the testpoint contacts 16 and 17 and bypass the gas tube element by communicating directly with the ground clip 50 and ground pin 40. Should during momentary excess surges the gas tube be inoperative, the openings 61 in the fibrous insulative strips 60 will serve as secondary air gap means to permit arcing between the testpoint contacts 16 and 17 and the ground clip 50. It will be noted that the gas tube is used both as a heat responsive means as well as an arcing means, thereby permitting the elimination of the usual wire wound bobbin surrounding a resiliently urged grounding pin, commonly used in the prior art.

We wish it to be understood that we do not consider the invention limited to the exact details of structure shown and set forth in this specification, for obvious modifications will occur to those skilled in the art to which the invention pertains.

We claim:

1. An improved subscriber circuit protector module of three element gas tube type comprising: a housing element and cap element defining a hollow void having a principal axis for containing electrically conductive components therein, a ground pin assembly including an elongated ground pin and a generally U-shaped ground clip carried by said ground pin adjacent at an inwardly disposed end of said ground pin, said ground clip including a base wall and a pair of flexible longitudinally extending walls, the free ends of said walls terminating in inwardly extending contact flanges; a plurality of long and short contacts, a pair of symmetrically arranged grounding contacts, each of said grounding contacts including a first end contact engaging said long and short contacts, a longitudinally extending portion disposed parallel to and in spaced relation to said longitudinally extending walls of said ground clip, an inwardly extending portion disposed parallel to a corresponding inwardly extending flange on said ground clip, and an elongated second end contact overlying said flange to define an interstice between the gas tube end terminal contacts and said longitudinally extending wall; a planar insulation member and a solder pellet disposed within said interstice to maintain said inwardly extending contact flanges of said ground clip in spaced relation relative to said second end contact of said grounding contacts; and a three element gas tube disposed between said end terminal contacts and electrically communicating therewith, said gas tube having a centrally disposed contact element communicating with said ground pin; whereby, upon the occurrence of a sustained current surge in said subscriber circuit sufficient to melt said solder pellet, said ground clip and said grounding contacts complete a grounding circuit bypassing said gas tube.

2. A protector module in accordance with claim 1, further characterized in said insulation member defining a through opening therein forming secondary air gap means in the grounding circuit.

3. A protector module in accordance with claim 1, further characterized in said solder pellet being of button-like configuration, including a shank portion passing through an opening in a respective grounding contact to be maintained thereby.

* * * * *